(12) United States Patent
Devta et al.

(10) Patent No.: US 11,531,674 B2
(45) Date of Patent: Dec. 20, 2022

(54) SYSTEM AND METHOD FOR SUPPORTING ROLLBACK OF CHANGES MADE TO TARGET SYSTEMS VIA AN INTEGRATION PLATFORM

(71) Applicant: ORACLE INTERNATIONAL CORPORATION, Redwood Shores, CA (US)

(72) Inventors: Prakash Kumar Devta, Bangalore (IN); Anuj Kaushal, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/156,327

(22) Filed: Jan. 22, 2021

(65) Prior Publication Data
US 2022/0237197 A1   Jul. 28, 2022

(51) Int. Cl.
*G06F 16/20* (2019.01)
*G06F 16/2457* (2019.01)
*G06F 11/14* (2006.01)

(52) U.S. Cl.
CPC .... *G06F 16/24578* (2019.01); *G06F 11/1469* (2013.01); *G06F 2201/82* (2013.01)

(58) Field of Classification Search
None
See application file for complete search history.

(56) References Cited

U.S. PATENT DOCUMENTS

| | | | |
|---|---|---|---|
| 7,761,406 B2* | 7/2010 | Harken | G06F 16/254 707/602 |
| 10,432,631 B2 | 10/2019 | Kaushal | |
| 10,585,678 B2 | 3/2020 | Devta | |
| 2012/0030689 A1* | 2/2012 | Li | G06F 9/541 719/318 |
| 2016/0092475 A1* | 3/2016 | Stojanovic | G06F 3/04883 707/805 |
| 2016/0232042 A1* | 8/2016 | Ritter | G06F 8/427 |
| 2017/0264612 A1 | 9/2017 | Kaushal | |
| 2019/0324763 A1 | 10/2019 | Devta | |
| 2021/0203714 A1 | 7/2021 | Devta | |
| 2021/0373915 A1 | 12/2021 | Devta | |

(Continued)

OTHER PUBLICATIONS

Oracle, "BPEL Designer and Service Engine User's Guide—Using the CompensateScope Element ", Copyright 2010; retrieved from <https://docs.oracle.com/cd/E19182-01/821-0539/ggnkc/index.html> on Jul. 8, 2022, 1 page.

(Continued)

*Primary Examiner* — Belix M Ortiz Ditren
(74) *Attorney, Agent, or Firm* — Tucker Ellis LLP

(57) ABSTRACT

Systems and methods for supporting rollback of changes made to target systems via an integration platform. Systems and methods can support reverting changes made to target applications via an integration platform (e.g., integration platform as a service (iPaaS)) with the help of a rollback activity. In order to aid the development and design of integration orchestrations, the integration platform can provide suggested rollback actions. In case of a failure in integration runtime, this rollback activity will revert changes made to the target applications prior to the point of fault. This helps ensure that systems remain in consistent state.

20 Claims, 9 Drawing Sheets

(56) References Cited

U.S. PATENT DOCUMENTS

| | | |
|---|---|---|
| 2022/0038367 A1 | 2/2022 | Devta |
| 2022/0103648 A1 | 3/2022 | Deshpande |
| 2022/0214931 A1 | 7/2022 | Devta |

OTHER PUBLICATIONS

Oracle, "BPEL Designer and Service Engine User's Guide—Using a Compensation Handler," Copyright 2010 retrieved from <https://docs.oracle.com/cd/E19182-01/821-0539/ggtap/index.html> on Jul. 8, 2022, 1 page.

* cited by examiner

| Endpoint Configuration Summary 605 | Adapter Endpoint Artifact 610 | Adapter Type 615 |
|---|---|---|
| Summary 1 | Adapter endpoint Artifact 1 | Application-1 |
| Summary 2 | Adapter endpoint Artifact 2 | Application-3 |
| Summary 3 | Adapter endpoint Artifact 3 | Application-3 |

| Endpoint Configuration Summary 705 | Reverse Action of 710 | Usage Count 715 |
|---|---|---|
| Summary 2 | Summary 1 | 5 |
| Summary 9 | Summary 1 | 12 |
| Summary 5 | Summary 3 | 2 |

SYSTEM AND METHOD FOR SUPPORTING ROLLBACK OF CHANGES MADE TO TARGET SYSTEMS VIA AN INTEGRATION PLATFORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related integration cloud services, and in particular, systems and methods for supporting rollback of changes made to target systems via an integration platform.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web-based integration designer for point and click integration between applications, a rich monitoring dashboard that provides real-time insight into the transactions.

SUMMARY

In accordance with an embodiment, systems and methods for supporting rollback of changes made to target systems via an integration platform. An exemplary method can provide a computer including one or more microprocessors. The method can run an integration platform on the computer. The method can further provide an integration orchestration at the integration platform, the integration orchestration having associated therewith a plurality of adapters, each adapter linking to an application external to the integration flow, wherein an adapter of the plurality of adapters comprises an invoke action. The method can display, during design of the integration orchestration, one or more rollback recommendations associated with the adapter of the plurality of adapters, via a user-interface of the integration platform.

Systems and methods can support reverting changes made to target applications via an integration platform (e.g., integration platform as a service (iPaaS)) with the help of a rollback activity. In order to aid the development and design of integration orchestrations, the integration platform can provide suggested rollback actions. In case of a failure in integration runtime, this rollback activity will revert changes made to the target applications prior to the point of fault. This helps ensure that systems remain in consistent state

BRIEF DESCRIPTION OF THE DRAWINGS

FIG. 6 is a data structure illustrating adapter artifacts added for various invoke actions, in accordance with an embodiment.

FIG. 7 is a data structure illustrating exemplary associations between rollback/reverse actions and their associated invoke actions, as well as usage counts, in accordance with an embodiment.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a Service, for example, Oracle Integration Cloud Service (ICS), can provide a cloud-based platform for building and deploying integrations flows that connect applications residing in the cloud or on-premises.

Integration Cloud Service

Figure 1:
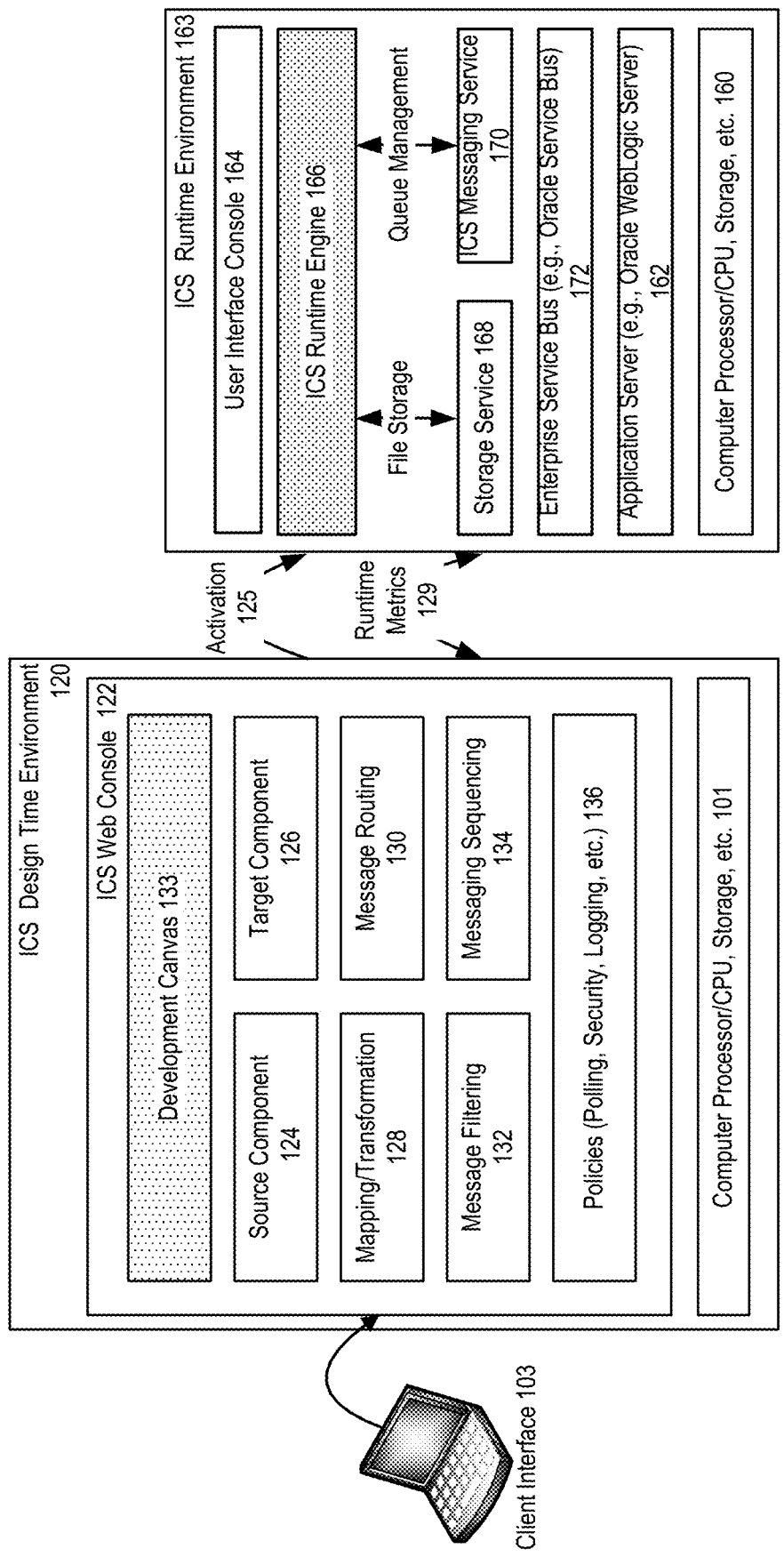
FIG. 1 illustrates an integration cloud service in accordance with an embodiment.

FIG. 1 illustrates an ICS platform for designing and executing an ICS integration flow, in according with an embodiment.

As shown in FIG. 1, the ICS platform can include a design-time environment 120, and a runtime environment 163. Each environment can execute on a computer including one or more processors, for example a computer 101 or 106.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e., query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
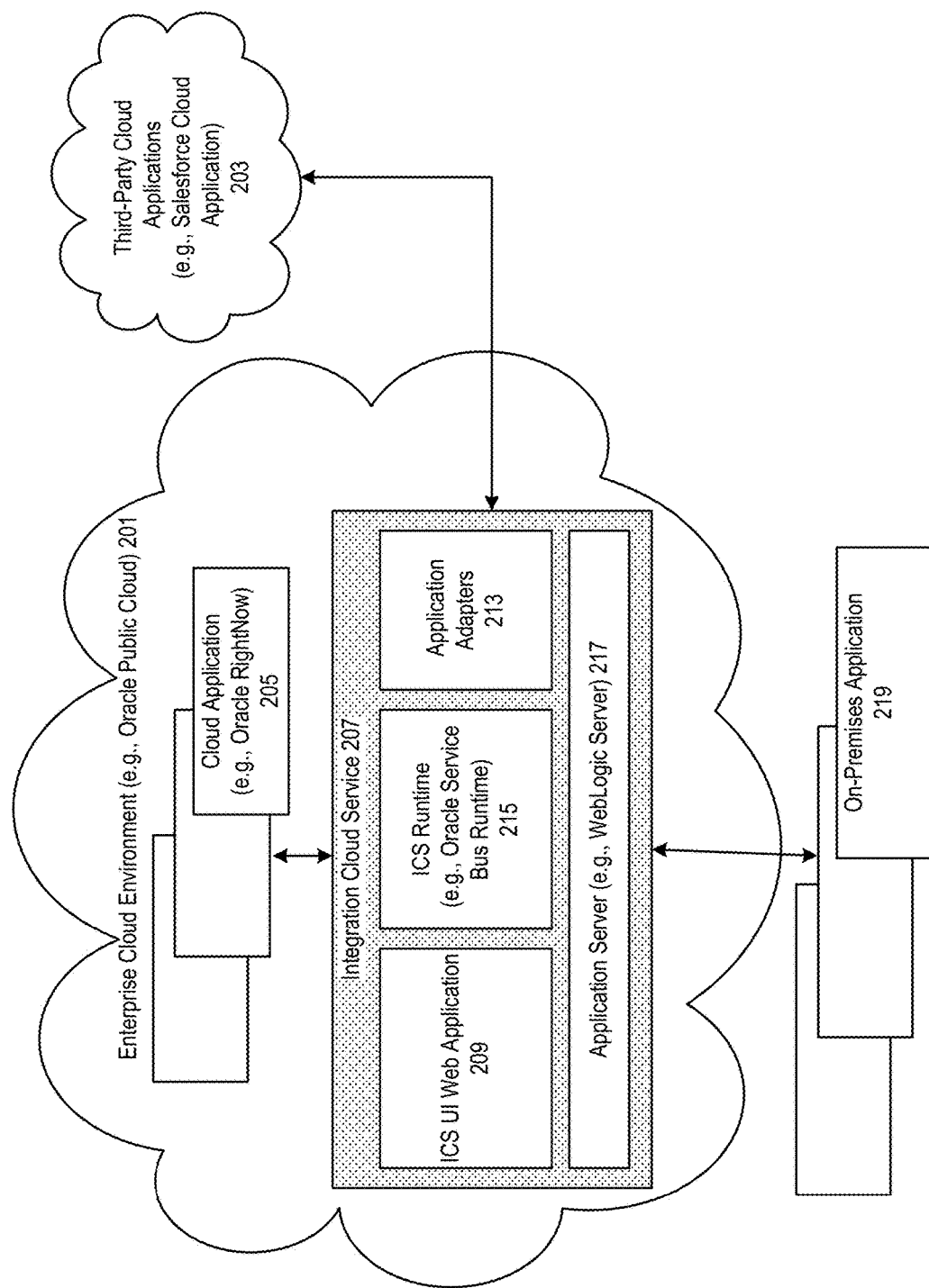
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3:
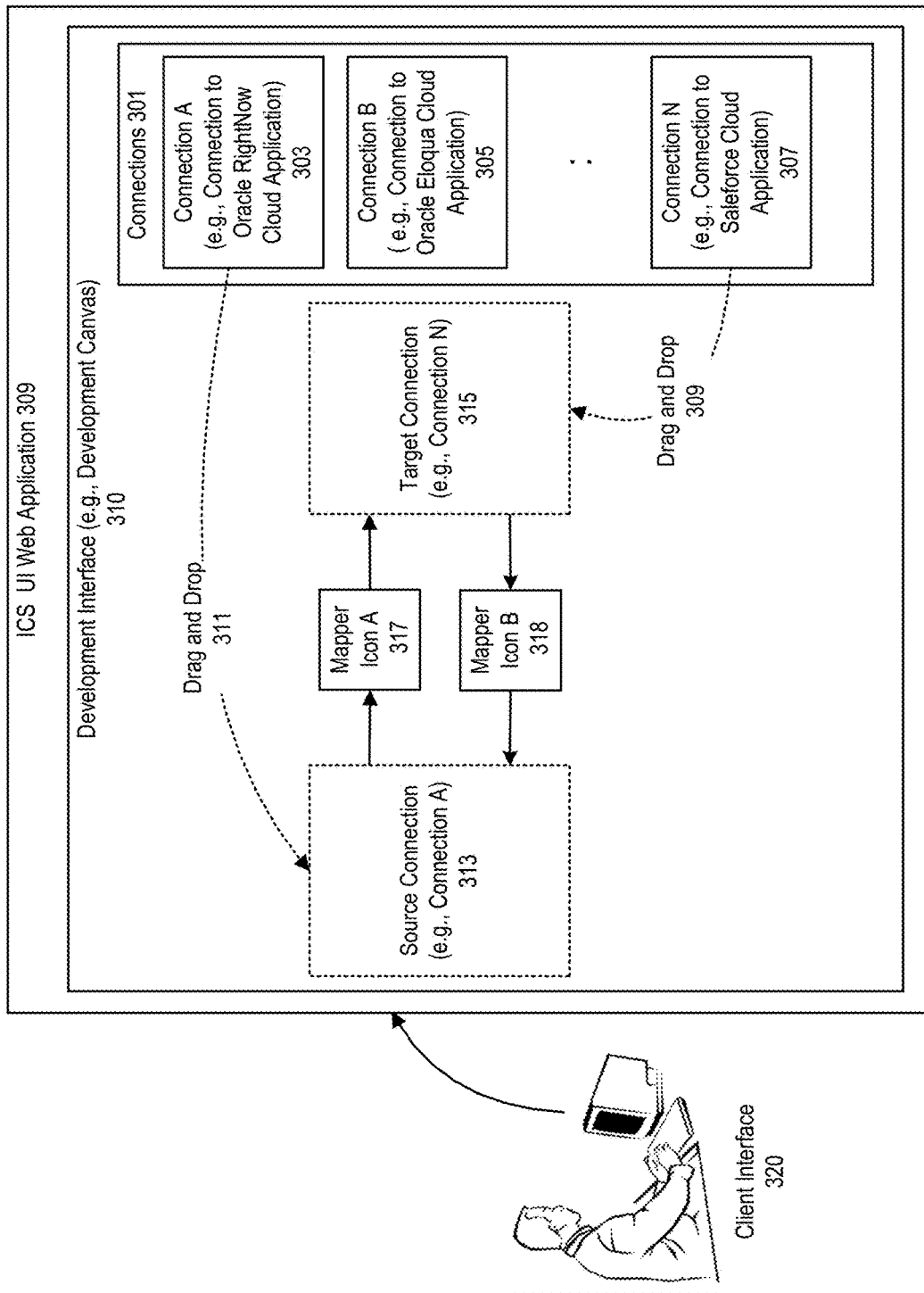
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Figure 4:
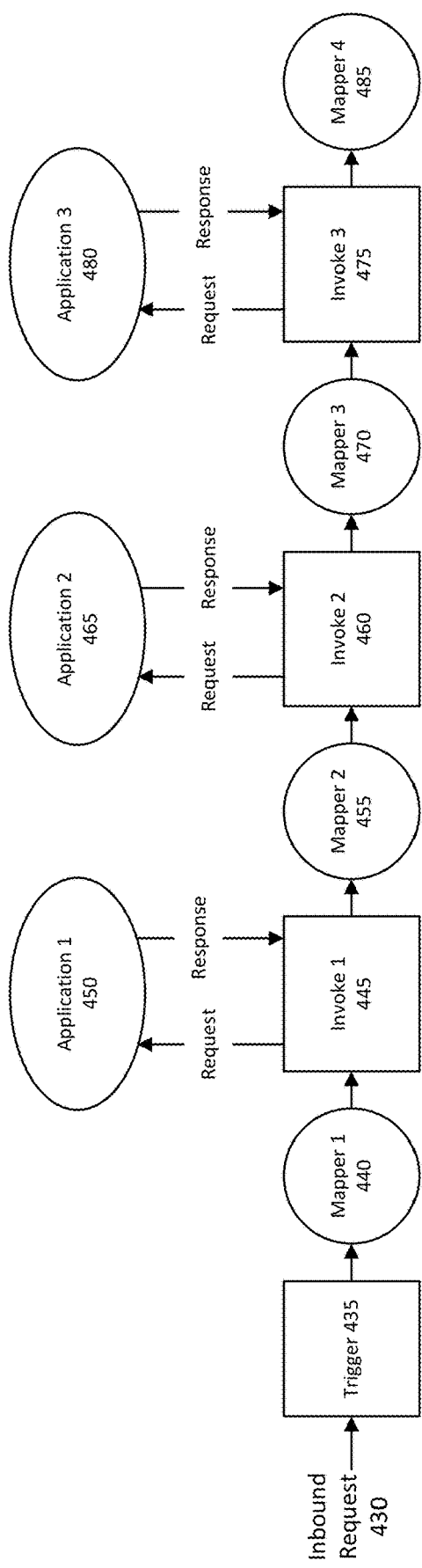
FIG. 4 shows an orchestration integration flow of applications, in accordance with an embodiment.

FIG. 4 shows an orchestration integration flow of applications, in accordance with an embodiment.

In accordance with an embodiment, an orchestration integration flow (i.e., orchestration of applications) can comprise a plurality of application adapters, such as invoke 1 445, invoke 2 460, and invoke 3 475. The orchestration integration flow can additionally comprise a number of mappers, such as mapper 1 440, mapper 2 455, mapper 3 470, and mapper 4 485, which each can map different sets of data, depending upon, e.g., the requirements of the application adapters.

In accordance with an embodiment, each application adapter (i.e., each invoke) can be associated with an external application (or an instance of an external application), such as application 1 450, application 2 465, and application 3 480.

In accordance with an embodiment, the invoke actions can vary between and within adapters. For example, some invoke actions can deploy and persist changes to target applications, while other invoke actions do not change target applications (e.g., "read-only" actions).

In accordance with an embodiment, an inbound request 430 can trigger 435 the orchestration integration flow to run or tested.

In accordance with an embodiment, during the execution of running of an integration flow, a failure can result. On a failure, for example, rollback of actions to target applications or systems can be desirable when an integration is prevented from completing.

Mechanism to Rollback Changes Made to Target Systems Via an Integration Platform In accordance with an embodiment, the present disclosure provides systems and methods for reverting changes made to target applications via an integration platform (e.g., integration platform as a service (iPaaS)) with the help of a rollback activity. In case of a failure in integration runtime, this rollback activity will revert changes made to the target applications prior to the point of fault. This helps ensure that systems remain in consistent state.

In accordance with an embodiment, integration platform makes use of adapters/connectors to interact with target applications. These adapters are used in orchestration flows for solving various business use-cases.

In accordance with an embodiment, generally these adapters interact with non-transactional systems via, e.g., HTTP (Hypertext Transfer Protocol).

In accordance with an embodiment, when an integration flow fails during runtime and is prevented from completing, what is desirable is to rollback/undo changes made to these target system(s) and applications and go back to a consistent state.

In accordance with an embodiment, rollback activities are generally provided in integration platforms as part of fault handler logic. For example, a compensation handler in SOA (service-oriented architecture) lets a developer rollback few activities in case of a runtime fault.

In accordance with an embodiment, the presently disclosed systems and methods provides a machine learning mechanism that can be used in conjunction with the development of an integration flow. The systems disclosed herein are provided for learning, discovering and suggesting rollback actions to an integration designer/developer for better user experience and correct behavior.

In accordance with an embodiment, for each "edit" action (e.g., actions of an integration flow which change the state of a target application or target systems), there can be one, or one or more, "rollback" or reverse actions (e.g., post to a social media endpoint will send a message, have a corresponding reverse action configured). These reverse actions can be learned and suggested to integration developer. These reverse actions may be called undo/rollback actions. For example, in the case where an invoke action is a posting of a message to a social media endpoint, a reverse or rollback action could be the deletion or editing of the published social media message.

In accordance with an embodiment, an integration platform can utilize systems and methods to learn reverse actions for APIs, and can present relevant rollback actions to a flow developer/designer to select and utilize within a flow being designed or updated. These reverse actions can also be edited and used. The map of [flow action being mapped to (list of rollback actions)] can be maintained by the integration platform using knowledge aggregated from various tenants and use-cases.

In accordance with an embodiment, at design time (i.e., the designing and developing of an integration flow by an integration developer/modeler), an integration modeler can set rollback boundary based on fault handling logic. This location would be a point in the integration orchestration before the fault generation location.

In accordance with an embodiment, a rollback activity can be added to the scope for a fault handler. While adding this activity at design time, the activity can ask for the location till rollback should be performed. This may be called rollback boundary. Rollback boundary can be entire scope involving all invokes before fault generation or it can be till fewer invokes from fault generation point. Once this is selected, an integration platform can check if all invokes (or interactions) within rollback boundary have a rollback/undo action configured. If any interaction in the rollback boundary doesn't have a rollback action configured then there could be 2 reasons:

a. The original action is a read only action and doesn't require a rollback.

b. The rollback is not possible or user did not add a rollback action.

In accordance with an embodiment, if any interaction within the rollback boundary doesn't have a rollback action configured, and if the action is read-only, then it will be ok to skip rollback for this interaction.

In accordance with an embodiment, if the action is not read-only and it falls under "b" category above, then a warning can be shown saying this interaction's rollback action is not configured, and a modeler can be queried whether the development of the flow should continue. If the modeler selects yes, then at runtime rollback of this interaction will be skipped. Otherwise, the integration platform can provide a list of suggested reverse actions for this from its knowledge base. The flow developer can then select an action from the presented list, or add a new action as rollback action for this interaction.

In accordance with an embodiment, the below are some features of the presently disclosed systems and methods:

1. An integration platform can learn rollback actions for various invoke actions using information collected from one, some, or all tenants of the integration platform.
2. As rollback activity is used by various tenants, the integration platform monitors and stores metrics associated with the use of the rollback activities. From such monitored metrics associated with use, integration platform can populate a knowledge database comprising information associated with which rollback action was used for which invoke action.
3. An integration platform can maintain this monitored and collected information in an associative data structure (e.g., HashMap, Key Value DB or cache (e.g., memcached, Redis, etc.)).
4. There can be many types of rollback action for a given invoke action.
5. Rollback actions for a given invoke action can be ranked based on number, type and context of usage. That is, for example, rollback actions can be contextualized via, for example, metadata identifying a target application or target system.
6. Input for rollback action can also be assigned from input/output of actual invoke action. That is, for example, the input to the rollback action can be the same as what went into the invoke activity (input or output). For example, in creating an incident (the invoke), the integration flow provided an identifier. When deleting or updating the incident, the rollback action will require the same identifier. Whatever input was given to the invoke, the same input will be made available to the rollback activity.
7. Rollback activity can be part of fault handler logic and can be applicable within the fault handler's scope. This activity will ask for rollback boundary and if none provided will consider all invokes before the fault generation logic as rollback boundary.
8. Rollback activity can ask for rollback action for each invoke in reverse order. This activity can suggest rollback action for each invoke found in rollback boundary from knowledge base.
9. If there is no rollback action found in knowledge base for a particular invoke, then an integration platform can query an integration designer to optionally create a rollback action. If created, then metadata of this action (Endpoint configuration summary) will be added to knowledge base for future use.
10. If no rollback action found/created, then integration designer can be presented an option to skip rollback for the action.
11. If a rollback action is selected from suggestions provided by an integration platform, then the integration platform can increment rollback action's usage counter in its knowledge base.
12. If rollback action is removed from rollback activity, then its counter is decreased in knowledge base.
13. Each invoke has an endpoint configuration summary that encapsulates the object and operation used in the target application.
14. For each invoke having an endpoint configuration summary, there can be a rollback endpoint configuration summary to undo the work of invoke.

Figure 5:
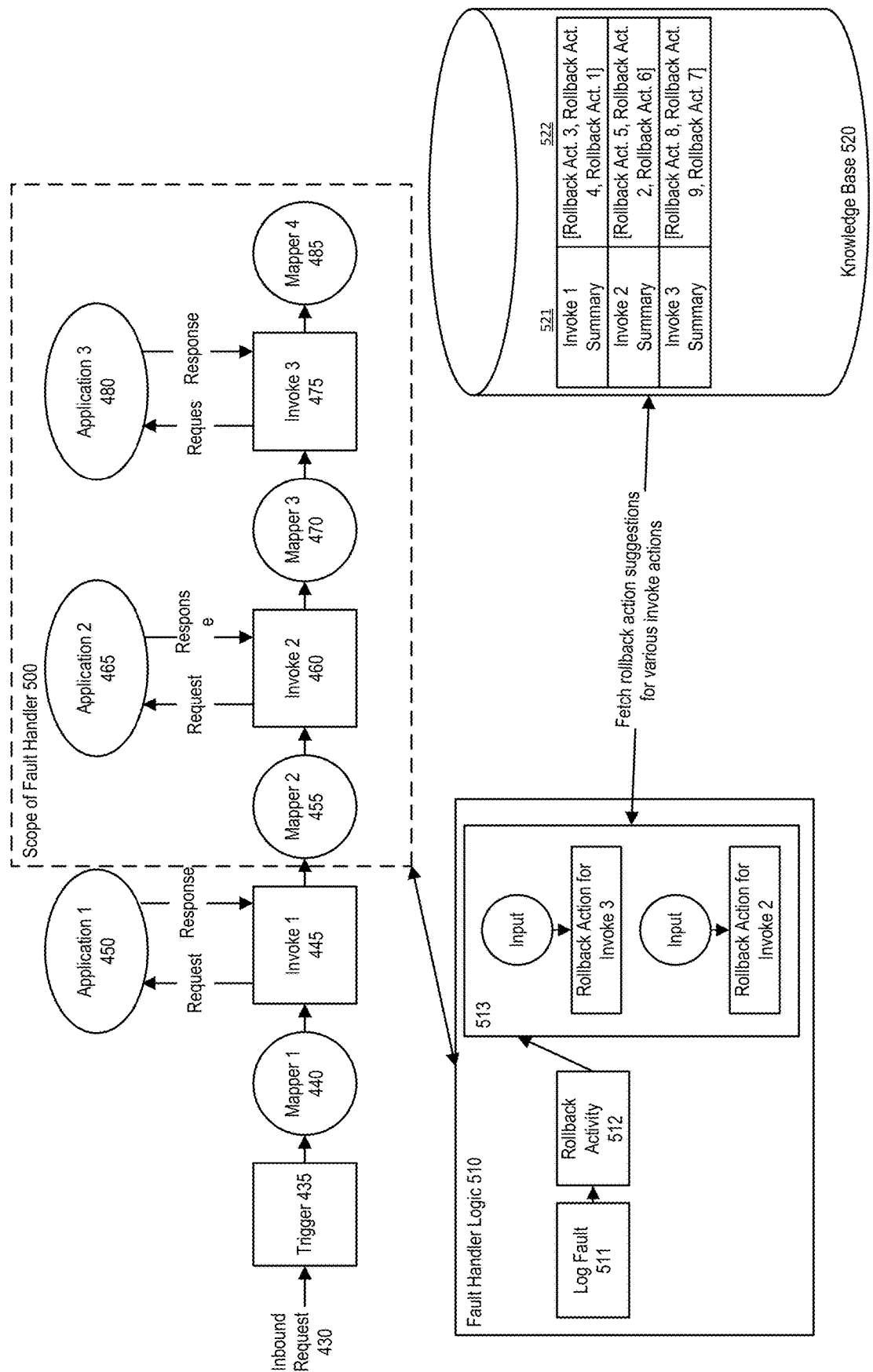
FIG. 5 shows a system for supporting rollback of changes made to target systems via an integration platform, in accordance with an embodiment.

FIG. 5 shows a system for supporting rollback of changes made to target systems via an integration platform, in accordance with an embodiment.

In accordance with an embodiment, an orchestration integration flow (i.e., orchestration of applications) can comprise a plurality of application adapters, such as invoke 1 445, invoke 2 460, and invoke 3 475. The orchestration integration flow can additionally comprise a number of mappers, such as mapper 1 440, mapper 2 455, mapper 3 470, and mapper 4 485, which each can map different sets of data, depending upon, e.g., the requirements of the application adapters.

In accordance with an embodiment, each application adapter (i.e., each invoke) can be associated with an external application (or an instance of an external application), such as application 1 450, application 2 465, and application 3 480.

In accordance with an embodiment, the invoke actions can vary between and within adapters. For example, some invoke actions can deploy and persist changes to target applications, while other invoke actions do not change target applications (e.g., "read-only" actions).

In accordance with an embodiment, an inbound request 430 can trigger 435 the orchestration integration flow to run or tested.

In accordance with an embodiment, during the execution of running of an integration flow, a failure can result. On a failure, for example, rollback of actions to target applications or systems can be desirable when an integration is prevented from completing.

In accordance with an embodiment, a rollback boundary can be set in the integration flow. As shown in the figure, the rollback boundary, or the scope of the integration flow with fault handler logic 500, can be defined as encompassing invokes 2 and 3 of the depicted integration flow. While depicted as only encompassing two of the three depicted invoke operations, one of ordinary skill in the art would readily understand that the defined scope of the fault logic can encompass more or less than that depicted.

In accordance with an embodiment, the system can additionally comprise fault handler logic 510, as well as a knowledge base 520.

In accordance with an embodiment, the knowledge base 520 can comprise a mapping between summaries of invoke action endpoint configuration summaries 521 and listings of rollback actions which are sorted 522. In some embodiments, the list of rollback actions, for each invoke action endpoint summary configuration, are sorted in decreasing order of usage count among all, some, or one tenant of the integration platform.

In accordance with an embodiment, on designing the integration flow comprising invokes 1, 2, and 3, the integration flow developer can be presented with a list suggested rollback actions for invokes 2 and 3 (within the rollback boundary 500). The flow developer can then optionally select one of the suggested rollback actions to be used by the fault handler logic 510 upon a failure of the execution of the integration flow.

In accordance with an embodiment, then, as depicted in FIG. 5, a flow developer can, during design of the integration flow, be presented (e.g., via a user interface) with rollback actions 5, 2, and 6 as options for rollback actions for invoke 2, and rollback actions 8, 9, and 7 for invoke 3.

In accordance with an embodiment, the rankings of these rollback action options can additionally be presented to the flow developer (e.g., via a user interface). These ranks can be presented as, for example, an ordered list, a "most to least" used ranking, or the like.

In accordance with an embodiment, on selection of a rollback action, the fault handler logic can then utilize the selected rollback action in conjunction with the invoke upon a failure of the integration flow.

In accordance with an embodiment, the fault handler logic 510 can log a fault 511 and begin the process of rolling back the activities 512. As depicted, the rollback 513 of the activities are configured to rollback until invoke 2 as that is the scope of the rollback boundary.

In accordance with an embodiment, the rollback input for each rollback action can comprise the input utilized for each invoke action. That is, for example, if part of an input for invoke 2 comprised an identifier for a user account, then the input for the rollback activity for invoke 2 would likewise comprise the identifier for the same user account.

In accordance with an embodiment, as an example, for suppose an endpoint configuration summary comprises create Incident in Oracle Service Cloud (RightNow). Then, a first tenant sets a Rollback endpoint configuration summary as Delete Incident from Oracle Service Cloud (RightNow). In the same integration platform, another tenant, or another user from the same tenant, sets a different Rollback endpoint configuration summary as Update Incident from Oracle Service Cloud (RightNow). Then, in accordance with an embodiment, whenever a user configures invoke for Create Incident in Oracle Service Cloud, then the user can be suggested both the rollback options (Delete Incident/Update incident) listed above.

In accordance with an embodiment, the following is an exemplary data structure: [Endpoint Configuration Summary-id—[Endpoint configuration summary-id of rollback1, Endpoint configuration summary-id of rollback2, Endpoint configuration summary-id of rollback3 etc.]]

FIG. 6 is a data structure illustrating adapter artifacts added for various invoke actions, in accordance with an embodiment.

In accordance with an embodiment, the data structure 600 can be maintained in a database or other storage medium accessible by the integration platform. The data structure 600 can comprise several sets of data related to each other. For example, the endpoint configuration summaries 605 can uniquely identify the configuration of any particular invoke activity within an integration flow or integration platform. The configuration for each summary can then be stored in the adapter endpoint artifact column 610. Finally, the specific adapter to be used with each endpoint configuration summary can be in column adapter type 615.

In accordance with an embodiment, as an example, the data structure of FIG. 6 can support a summary of "Create incident in RightNow" in a column 605. Then, the configuration which is needed to configure an invoke activity to create an incident in RightNow would be stored in column 610. Finally, the third column is a unique identification of the adapter that will be used in the Create Incident in RightNow would be stored in column 615.

FIG. 7 is a data structure illustrating exemplary associations between rollback/reverse actions and their associated invoke actions, as well as usage counts, in accordance with an embodiment.

In accordance with an embodiment, the data structure 700 can be maintained in a database or other storage medium accessible by the integration platform. The data structure 700 can comprise several sets of data related to each other. For example, the endpoint configuration summaries 705 can uniquely identify the configuration of any particular rollback or reverse activity within an integration flow or integration platform. The invoke action for which each rollback or reverse action is then stored in column 710. Finally, based upon monitoring of one, some, or all tenants of an integration platform, a usage count associated with each rollback/reverse action can be stored at column 715. As indicated and discussed above, the counts of column 715 can be updated, e.g., incremented or decremented, depending on a monitoring of tenant usage of the rollback/reverse actions summarized in column 705.

In accordance with an embodiment, then, from the data structure 700 stored at a knowledge database, the integration platform can provide, for examples, recommendations for rollback actions. As displayed in FIG. 7, for example, the system would display rollback actions associated with Summary9 and Summary2 for an invoke action associated with Summary1.

In accordance with an embodiment, when an integration modeler indicates to an integration platform to add a reverse action for an adapter invoke endpoint whose endpoint configuration summary matches with the endpoint configuration summary of Summary1, then the integration platform can suggest rollback actions as endpoint configuration Summary9 and Summary2. When the user selects endpoint configuration summary of a rollback action, the integration platform can render a configuration wizard for this action.

In accordance with an embodiment, when fault is thrown by integration runtime, the fault handler can execute undo/rollback action (if a rollback activity is found in fault handler logic) for all the interactions falling within the rollback boundaries in reverse order. If an interaction doesn't have a rollback action configured then its rollback will be skipped and a warning will be logged.

Figure 8:
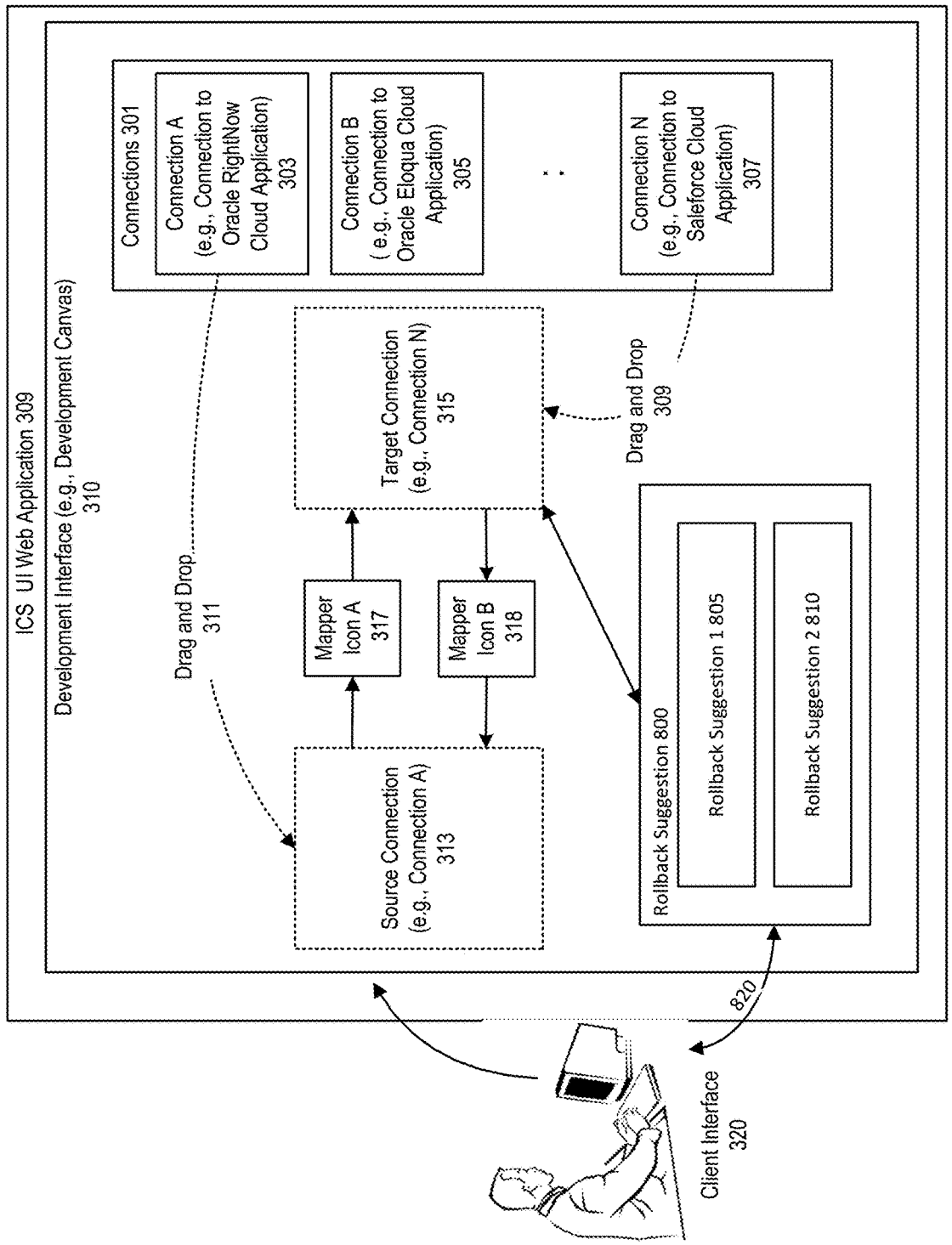
FIG. 8 shows a system for supporting rollback of changes made to target systems via an integration platform, in accordance with an embodiment.

FIG. 8 shows a system for supporting rollback of changes made to target systems via an integration platform, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

In accordance with an embodiment, a rollback suggestion module 800 can be provided within the development interface 310. The rollback suggestion module can read and write to and from a knowledge database, as described above (but not shown in the Figure).

In accordance with an embodiment, by utilizing the above described knowledge database, upon designing an integration orchestration, the rollback suggestion module 800 can provide a number of rollback suggestions, such as rollback suggestion 1 805 and rollback suggestion 2 810.

In accordance with an embodiment, such rollback suggestions can be provided by the knowledge database based upon, e.g., a selected adapter from a target connection, such as target connection 315, selected via the client interface.

In accordance with an embodiment, the rollback suggestions 1 and 2 can be provided as a ranked list based upon, for example, a usage count associated with each of the rollback suggestions 1 and 2.

In accordance with an embodiment, upon display, the system can receive 820 a selection of one of the rollback suggestions, such as rollback suggestion 1 or 2. Alternatively, the system can receive an indication that neither rollback suggestion as selected, and can instead either determine that no rollback action is set, or can receive instructions to create a new rollback action for an indicated connection.

Figure 9:
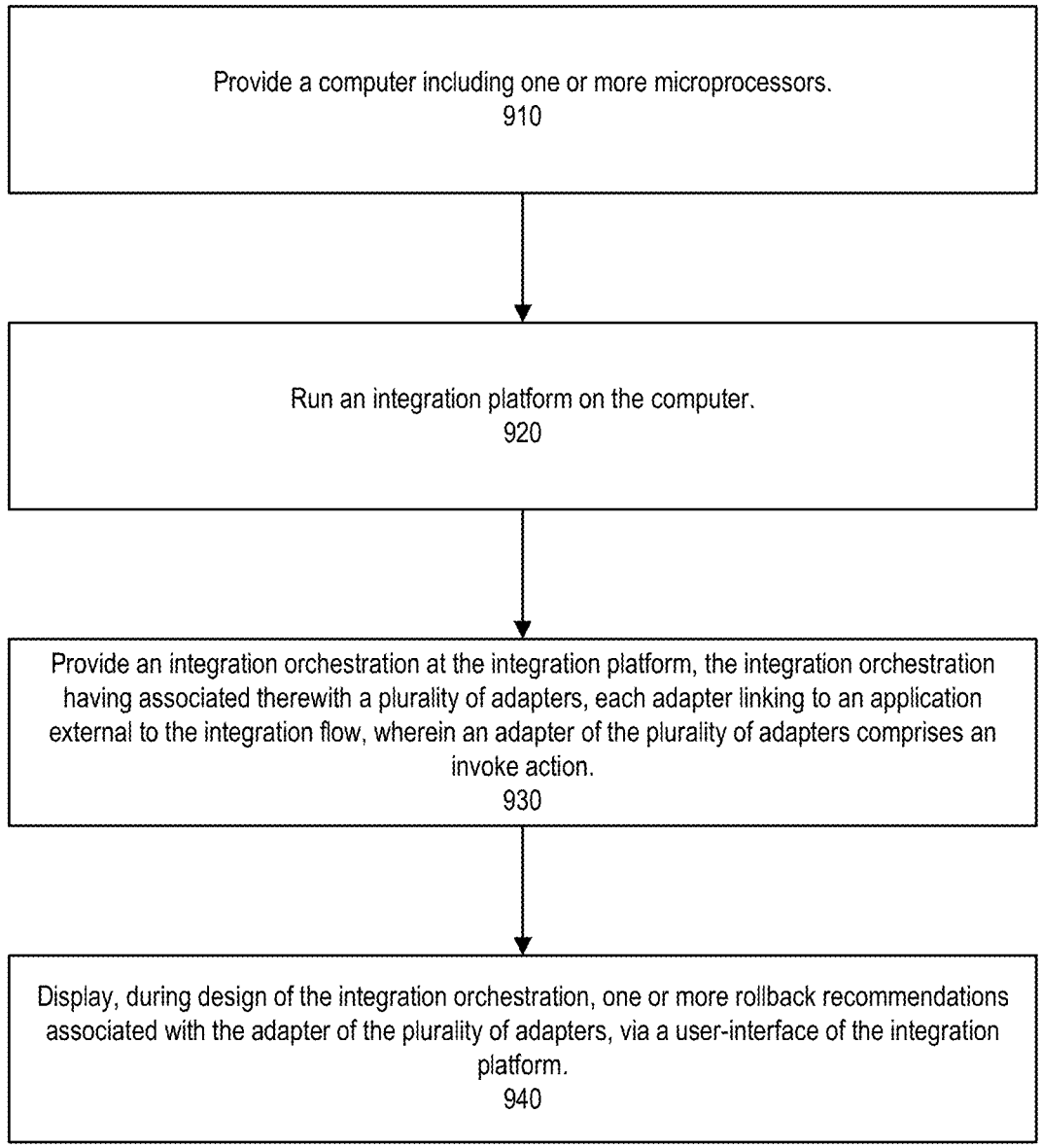
FIG. 9 is a flowchart of a method for supporting rollback of changes made to target systems via an integration platform, in accordance with an embodiment.

FIG. 9 is a flowchart of a method for supporting rollback of changes made to target systems via an integration platform, in accordance with an embodiment.

In accordance with an embodiment, at step 910, the method can provide a computer including one or more microprocessors.

In accordance with an embodiment, at step 920, the method can run an integration platform on the computer.

In accordance with an embodiment, at step 930, the method can further provide an integration orchestration at the integration platform, the integration orchestration having associated therewith a plurality of adapters, each adapter linking to an application external to the integration flow, wherein an adapter of the plurality of adapters comprises an invoke action.

In accordance with an embodiment, at step 940, the method can display, during design of the integration orchestration, one or more rollback recommendations associated with the adapter of the plurality of adapters, via a user-interface of the integration platform.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting rollback of changes made to target systems via an integration platform, comprising:
   a computer including one or more microprocessors;
   an integration platform running on the computer; and
   an integration orchestration at the integration platform, the integration orchestration having associated therewith a plurality of adapters, each adapter linking to an application external to the integration flow, wherein an adapter of the plurality of adapters comprises an invoke action;
   wherein during design of the integration orchestration, one or more rollback recommendations associated with the adapter of the plurality of adapters are displayed, via a user-interface of the integration platform.

2. The system of claim 1,
   wherein said one or more rollback recommendations are based upon a query of a knowledge base of the integration platform.

3. The system of claim 2,
   wherein said one or more rollback recommendations comprises two or more rollback recommendations.

4. The system of claim 3,
   wherein said two or more rollback recommendations are displayed, via the user interface, as an ordered list of ranked options, each option corresponding to one of the said two or more rollback options.

5. The system of claim 4,
   wherein the ordered list of ranked options is generated based upon a recorded usage count, each of the two or more rollback options having associated therewith a usage count within the knowledge base.

6. The system of claim 5,
   wherein upon the integration platform receiving an indication of a selection of one of the two or more rollback options during design of the integration orchestration, a count associated with the selected rollback option is incremented.

7. The system of claim 1,
   wherein an input to each of the one or more rollback options comprises the same input as the invoke action.

8. A method for supporting rollback of changes made to target systems via an integration platform, comprising:
   providing a computer including one or more microprocessors;
   running an integration platform on the computer;
   providing an integration orchestration at the integration platform, the integration orchestration having associated therewith a plurality of adapters, each adapter linking to an application external to the integration flow, wherein an adapter of the plurality of adapters comprises an invoke action; and
   displaying, during design of the integration orchestration, one or more rollback recommendations associated with the adapter of the plurality of adapters, via a user-interface of the integration platform.

9. The method of claim 8,
   wherein said one or more rollback recommendations are based upon a query of a knowledge base of the integration platform.

10. The method of claim 9,
    wherein said one or more rollback recommendations comprises two or more rollback recommendations.

11. The method of claim 10,
    wherein said two or more rollback recommendations are displayed, via the user interface, as an ordered list of ranked options, each option corresponding to one of the said two or more rollback options.

12. The method of claim 11,
    wherein the ordered list of ranked options is generated based upon a recorded usage count, each of the two or more rollback options having associated therewith a usage count within the knowledge base.

13. The method of claim 12,
    wherein upon the integration platform receiving an indication of a selection of one of the two or more rollback options during design of the integration orchestration, a count associated with the selected rollback option is incremented.

14. The method of claim 8,
    wherein an input to each of the one or more rollback options comprises the same input as the invoke action.

15. A non-transitory computer readable storage medium, having instructions for supporting rollback of changes made to target systems via an integration platform, which when read an executed cause a computer to perform steps comprising:
- providing a computer including one or more microprocessors;
- running an integration platform on the computer;
- providing an integration orchestration at the integration platform, the integration orchestration having associated therewith a plurality of adapters, each adapter linking to an application external to the integration flow, wherein an adapter of the plurality of adapters comprises an invoke action; and
- displaying, during design of the integration orchestration, one or more rollback recommendations associated with the adapter of the plurality of adapters, via a user-interface of the integration platform.

16. The non-transitory computer readable storage medium of claim 15,
- wherein said one or more rollback recommendations are based upon a query of a knowledge base of the integration platform.

17. The non-transitory computer readable storage medium of claim 16,
- wherein said one or more rollback recommendations comprises two or more rollback recommendations.

18. The non-transitory computer readable storage medium of claim 17,
- wherein said two or more rollback recommendations are displayed, via the user interface, as an ordered list of ranked options, each option corresponding to one of the said two or more rollback options.

19. The non-transitory computer readable storage medium of claim 18,
- wherein the ordered list of ranked options is generated based upon a recorded usage count, each of the two or more rollback options having associated therewith a usage count within the knowledge base.

20. The non-transitory computer readable storage medium of claim 19,
- wherein upon the integration platform receiving an indication of a selection of one of the two or more rollback options during design of the integration orchestration, a count associated with the selected rollback option is incremented.

* * * * *

UNITED STATES PATENT AND TRADEMARK OFFICE
CERTIFICATE OF CORRECTION

PATENT NO. : 11,531,674 B2
APPLICATION NO. : 17/156327
DATED : December 20, 2022
INVENTOR(S) : Devta et al.

It is certified that error appears in the above-identified patent and that said Letters Patent is hereby corrected as shown below:

On the Title Page

On page 2, Column 1, under item (56) Other Publications, Line 2, delete "2010" and insert -- 2010; --, therefor.

On page 2, Column 1, under item (56) Other Publications, Line 3, delete "ggtap" and insert -- ggtqp --, therefor.

In the Drawings

On sheet 5 of 9, in Figure 5, Line 4, delete "Respons" and insert -- Response --, therefor.

On sheet 5 of 9, in Figure 5, Line 4, delete "Reques" and insert -- Request --, therefor.

Signed and Sealed this
Eighth Day of August, 2023

Katherine Kelly Vidal
*Director of the United States Patent and Trademark Office*